C. STEBBINS.
Wagon Bolster.
No. 73,471. Patented Jan. 21, 1868.
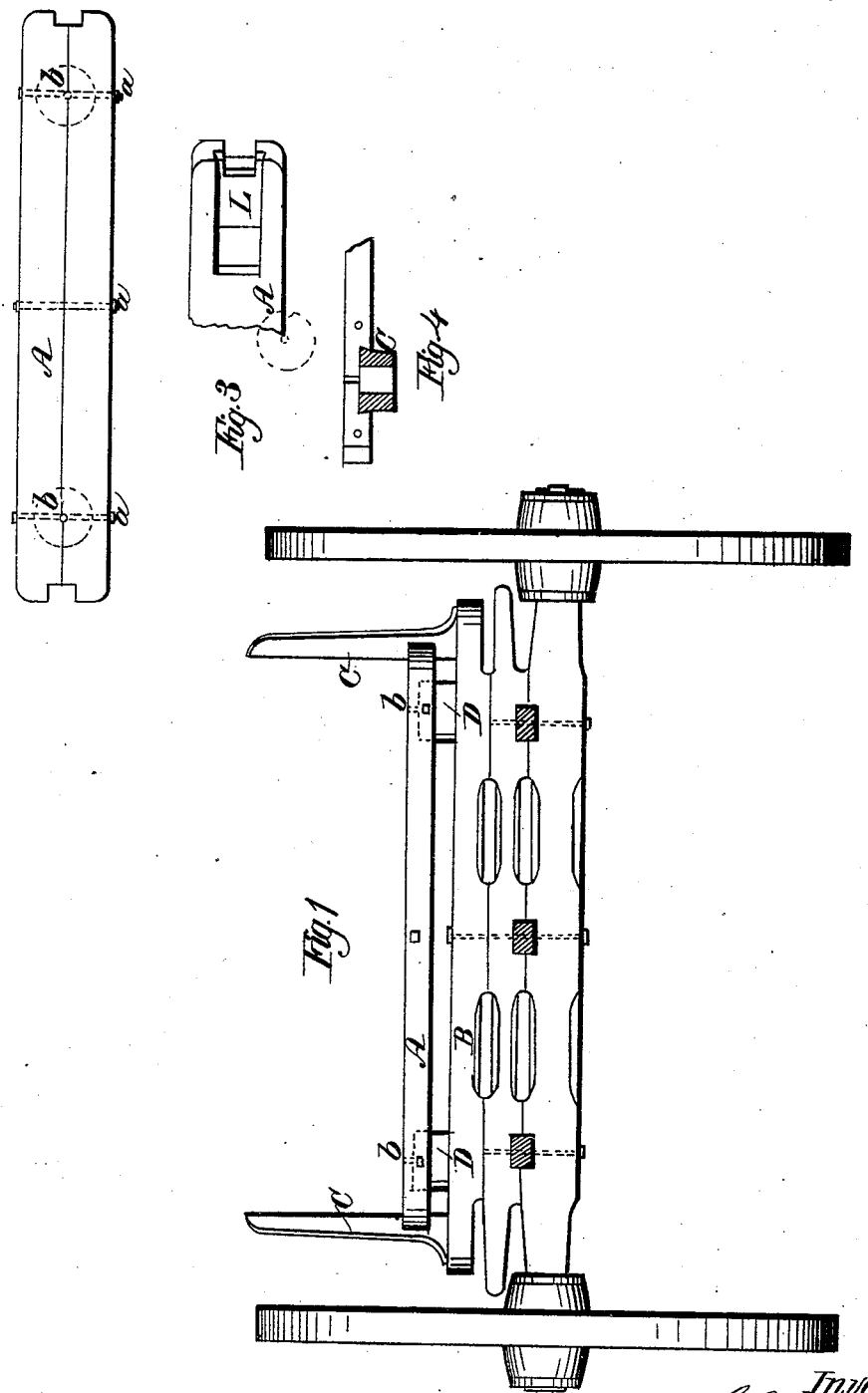

United States Patent Office.

CHARLES STEBBINS, OF OWEGO, NEW YORK.

Letters Patent No. 73,471, dated January 21, 1868.

IMPROVEMENT IN WAGON-BOLSTER.

The Schedule referred to in these Letters Patent and making part of the same.

TO WHOM IT MAY CONCERN:

Be it known that I, CHARLES STEBBINS, of Owego, county of Tioga, and State of New York, have invented a new and useful Improvement in Wagon-Bolsters; and I do hereby declare the following is a full, clear, and exact description of the same, reference being had to the annexed drawing, making a part of this specification.

Figure 1 represents an elevation of an ordinary wagon-bolster of a lumber-wagon or sleigh. B, fig. 1, represents a false bolster, having slots formed at each end to accommodate the stakes C C in the bolster B. D is a block or cylindrical piece of vulcanized or other India rubber fitted into the false bottom, as shown by the dotted lines in the false bottom A, Figures 1 and 2, or to be of a conical form, as shown in section in Figure 4, or it may be a block of vulcanized or other India rubber, fitted into a cavity of dove-tail form, as in Figure 3. In the first instance, the rubber is secured by the bolts $a\ a$ passing through it; in the second, by the false bolster being made in two parts, and a cavity formed to receive the conical form of the rubber, and bolted together by the bolts $a\ a\ a$; and, thirdly, by placing a block of rubber in the dove-tail formed cavity, and securing it by the wooden block L. In order to strengthen the false bolster, and render the rubber effective, a plate of iron may be secured to it on top, or a casting, forming a box, let in to receive the rubber. The object of the rubber, of which there may be two or more pieces, is to form a spring to receive the jar of the load on rough or uneven roads, and to render it, therefore, easier for teams as well as for the gear of the vehicle.

What I claim as my invention, and desire to secure by Letters Patent, is—

The application of two or more rubber springs to the bolsters of a buggy, lumber-wagon, cart, or any vehicle drawn or moved by cattle or horses, in the manner and for the purpose above described.

CHARLES STEBBINS.

Witnesses:
JUAN PATTISON,
FAYETTE S. CURTIS.